UNITED STATES PATENT OFFICE.

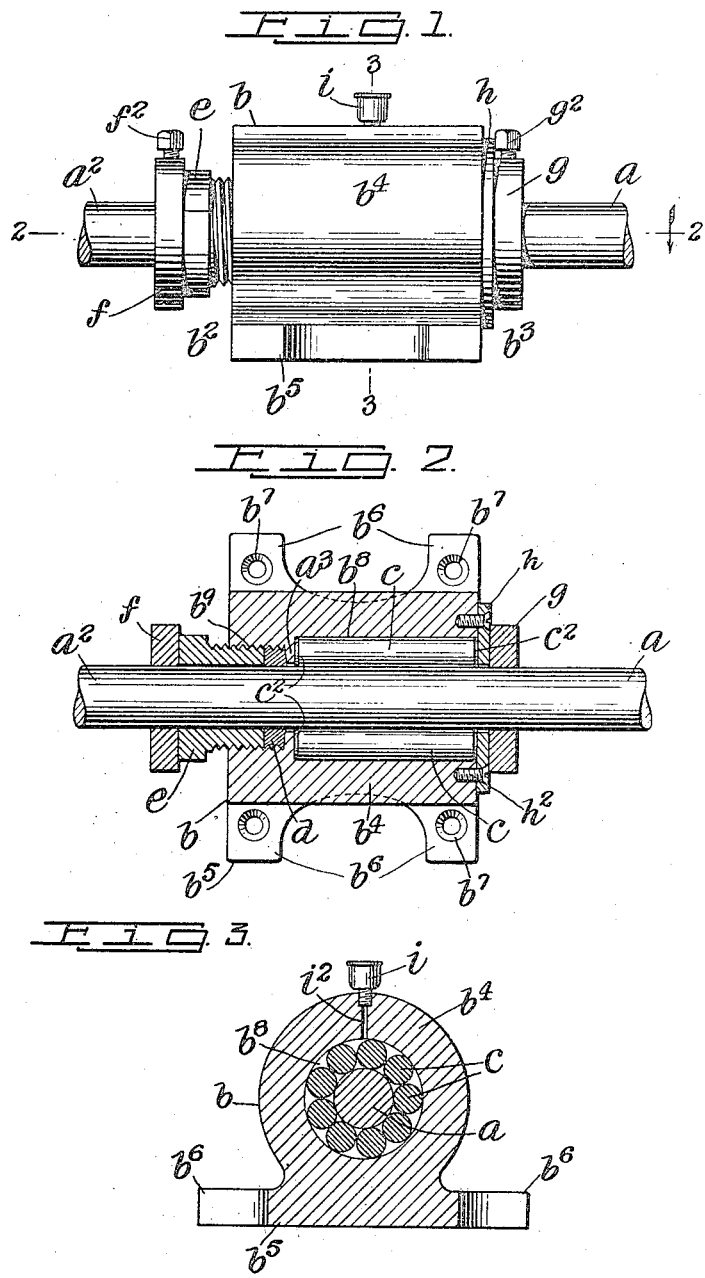

JAMES J. COURTNEY, OF BROOKLYN, NEW YORK.

BEARING FOR PROPELLER-SHAFTS.

1,267,382.

Specification of Letters Patent. Patented May 28, 1918.

Application filed October 16, 1917. Serial No. 196,813.

*To all whom it may concern:*

Be it known that I, JAMES J. COURTNEY, a citizen of the United States, and residing at Brooklyn, in the county of Kings and State of New York, have invented certain new and useful Improvements in Bearings for Propeller-Shafts, of which the following is a specification, such as will enable those skilled in the art to which it appertains to make and use the same.

This invention relates to bearings for power shafts and particularly for propeller shafts, and the object thereof is to provide an improved bearing of this class which while being, as above stated, particularly designed for use in connection with the propeller shafts of ships, may also be used in connection with power shafts of any class having a stationary or fixed bearing through which they pass.

The invention is fully disclosed in the following specification, of which the accompanying drawing forms a part, in which the separate parts of my improvement are designated by suitable reference characters in each of the views, and in which:—

Figure 1 is a side view of my improved shaft bearing;

Fig. 2 a horizontal section through the bearing on the line 2—2 of Fig. 1; and

Fig. 3 a vertical cross section on the line 3—3 of Fig. 1.

In the drawing forming part of this specification, I have shown at $a$ an ordinary propeller shaft, and at $b$ my improved bearing, and in the use of my improvement as a bearing for propeller shafts, said bearing is so mounted that the end $b^2$ thereof is the outboard end and the end $b^3$ the inboard end and the propeller is connected with the end portion $a^2$ of the shaft.

The bearing $b$ comprises a main outer cylindrical casing $b^4$ having a base $b^5$, preferably provided with laterally directed ears or projections $b^6$, having bolt or screw holes $b^7$ by which it may be secured in position, and said casing $b^4$ is provided with a central longitudinal bore through which the shaft $a$ is passed, and the inboard end portion of the said bore is enlarged to form a roller bearing chamber $b^8$ in which are placed bearing rollers $c$.

The roller bearing chamber $b^8$ and the bearing rollers $c$ take up about three-quarters of the length of the casing $b^4$, and the outboard end of the bore in the casing $b^4$ through which the shaft $a$ passes is enlarged to form a stuffing box $b^9$ in which is placed packing material $d$, and the stuffing box $b^9$ is closed by a screw cap $e$ in the usual manner, and mounted on the outboard end of the shaft $a$ adjacent to the screw cap $e$ is a collar $f$ which may be locked in any desired position by a set screw $f^2$, and a similar collar $g$ is mounted on the shaft $a$ inwardly of the bearing or bearing casing $b^4$, and is also provided with a set screw $g^2$, whereby it may be locked to the shaft $a$ in any desired position, and between the collar $g$ and the bearing, or the casing $b^4$ thereof, is placed a washer $h$ which is secured to said casing by screws $h^2$, the heads of which are countersunk in said washer.

The end portions of the bearing rollers $c$ are slightly beveled or rounded as shown at $c^2$, and the inner end portions of said roller bearings bear on the washer $h$, while the outer end portions thereof bear on an inwardly directed annular shoulder $a^3$ formed in the casing $b^4$ between the roller bearing chamber $b^8$ and the stuffing box chamber $b^9$ and integral with said casing.

The top of the bearing casing $b^4$ is provided with an oil cup $i$ which communicates with the roller bearing chamber $b^8$ through a passage $i^2$, and in the use of my improved bearing the collars $f$ and $g$ may be adjusted as desired, and when the bearing is used as a propeller shaft bearing, the stuffing box at the outboard end thereof will prevent any water from passing through the bore or into the roller bearing chamber, as will be readily understood; while the said stuffing box will not, as will also be understood, interfere in any way with the use of said bearing when applied to, or used in connection with an ordinary power shaft.

In the construction shown, the bearing rollers $c$ are one-half the diameter of the shaft $a$, and this is the proportionate dimensions for said parts which I prefer, but it will be understood that my invention is not limited to this or any other proportion between the dimensions of the bearing rollers $c$ and said shaft.

In the use of the device, the roller bearing chamber $b^8$ may be filled, or partially filled, with lubricating material at any time, and this operation will prevent the necessity of giving attention to this matter of lubrication for long periods.

Having fully described my invention, what

I claim as new and desire to secure by Letters Patent, is:—

1. A bearing for power shafts, comprising a main outer casing having a central longitudinal bore through which the shaft passes, one end portion of said bore being enlarged to form a roller bearing chamber in which are placed bearing rollers, and the other end portion of said bore being enlarged to form a stuffing box, the inner end of the roller bearing chamber being closed by an inwardly directed annular shoulder formed in the casing and the outer end of said chamber being closed by a washer secured to the casing, and said shaft being provided at both ends of the bearing with collars which are adjustably secured thereto.

2. A bearing for propeller shafts, comprising a main outer casing having a central bore through which the shaft passes, the outboard end of said bearing being provided with a stuffing box and the inner portion thereof being enlarged to form a roller bearing chamber in which are placed bearing rollers, and the shaft being provided at each end of the bearing with collars which are adjustably secured thereto.

In testimony that I claim the foregoing as my invention I have signed my name, in presence of the subscribing witnesses, this 11th day of October, 1917.

JAMES J. COURTNEY.

Witnesses:
C. E. MULREANY,
H. E. THOMPSON.

Copies of this patent may be obtained for five cents each, by addressing the "Commissioner of Patents, Washington, D. C."